United States Patent
Lee et al.

(10) Patent No.: US 10,229,506 B2
(45) Date of Patent: *Mar. 12, 2019

(54) OPTICAL TRACKING SYSTEM, AND METHOD FOR CALCULATING POSTURE OF MARKER PART IN OPTICAL TRACKING SYSTEM

(71) Applicants: KOH YOUNG TECHNOLOGY INC., Seoul (KR); KYUNGPOOK NATIONAL UNIVERSITY INDUSTRY-ACADEMIC COOPERATION FOUNDATION, Daegu (KR)

(72) Inventors: Hyun Ki Lee, Daegu (KR); You Seong Chae, Daegu (KR); Min Young Kim, Daegu (KR)

(73) Assignees: KOH YOUNG TECHNOLOGY INC., Seoul (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/314,669

(22) PCT Filed: May 29, 2015

(86) PCT No.: PCT/KR2015/005442
§ 371 (c)(1),
(2) Date: Nov. 29, 2016

(87) PCT Pub. No.: WO2015/183049
PCT Pub. Date: Dec. 3, 2015

(65) Prior Publication Data
US 2017/0193670 A1    Jul. 6, 2017

(30) Foreign Application Priority Data

May 29, 2014   (KR) .................. 10-2014-0065168

(51) Int. Cl.
*G06T 7/246* (2017.01)
*G06T 7/20* (2017.01)
*G06T 7/73* (2017.01)
*G06T 7/70* (2017.01)

(52) U.S. Cl.
CPC ............... *G06T 7/246* (2017.01); *G06T 7/20* (2013.01); *G06T 7/70* (2017.01); *G06T 7/73* (2017.01);
(Continued)

(58) Field of Classification Search
CPC .. G06T 7/246; G06T 7/73; G06T 7/80; G06T 2207/30204; G06T 2207/10056
See application file for complete search history.

(56) References Cited

U.S. PATENT DOCUMENTS 9,478,030 B1 *  10/2016  Lecky .................... G06Q 10/08
9,832,441 B2 *  11/2017  Osman .................... H04N 9/87
(Continued)

FOREIGN PATENT DOCUMENTS

CN    101013030    8/2007
CN    101059600    10/2007
(Continued)

OTHER PUBLICATIONS

International Search Report for International Application No. PCT/KR2015/005442, dated Sep. 2, 2015.
(Continued)

*Primary Examiner* — Yon J Couso
(74) *Attorney, Agent, or Firm* — Kile Park Reed & Houtteman PLLC

(57) ABSTRACT

An optical tracking system comprises a marker part, an image forming part, and a processing part. The marker part includes a pattern having particular information and a first lens which is spaced apart from the pattern and has a first focal length. The image forming part includes a second lens having a second focal length and an image forming unit which is spaced apart from the second lens and forms an image of the pattern by the first lens and the second lens. The processing part determines the posture of the marker part from a coordinate conversion formula between a coordinate on the pattern surface of the pattern and a pixel coordinate on the image of the pattern, and tracks the marker part by using the determined posture of the marker part. Therefore, the present invention can accurately track a marker part by a simpler and easier method.

11 Claims, 9 Drawing Sheets

(52) U.S. Cl.
CPC .............. *G06T 2207/10056* (2013.01); *G06T 2207/30204* (2013.01)

(56) References Cited

U.S. PATENT DOCUMENTS

| | | |
|---|---|---|
| 2007/0069026 A1 | 3/2007 | Aoyama |
| 2008/0249663 A1 | 10/2008 | Aoyama |
| 2011/0017826 A1 | 1/2011 | Mohan et al. |
| 2011/0169861 A1 | 7/2011 | Suzuki et al. |

FOREIGN PATENT DOCUMENTS

| | | |
|---|---|---|
| CN | 102857785 | 1/2013 |
| JP | 2007-090448 | 4/2007 |
| JP | 2007-90448 | 4/2007 |
| KR | 10-0971667 | 7/2010 |
| KR | 10-2011-0081759 | 7/2011 |
| KR | 10-1262181 | 5/2013 |

OTHER PUBLICATIONS

You Seong Chae et al., "An Image Based Coordinate Tracking System Using Afocal Optics for Surgical Navigation"; Progress in Optomechatronic Technologies, Oct. 28, 2013, pp. 141-152.

"Progress in Optomechatronic Technologies"; Springer for Research and Development, Proceedings of the 2013 International Symposium on Optomechatronic Technologies, Oct. 28-30, 2013, pp. 1-6.

Elan Dubrofsky "Homography Estimation"; A Master's Essay submitted in partial fulfillment of the requirements for the degree of Master of Science; The University of British Columbia, Vancouver, Mar. 1, 2009, pp. 1-32.

European Office Action for European Application No. 15799209, dated Aug. 29, 2018.

Chinese Office Action with English translation for Chinese Application No. 201580028419; dated Oct. 12, 2018.

\* cited by examiner

OPTICAL TRACKING SYSTEM, AND METHOD FOR CALCULATING POSTURE OF MARKER PART IN OPTICAL TRACKING SYSTEM

TECHNICAL FIELD

The present invention relates to an optical tracking system and a method for calculating the posture of a marker part of the optical tracking system. More particularly, the present invention relates to an optical tracking system and a method for calculating the posture of a marker part of the optical tracking system by using pattern information.

BACKGROUND ART

In general, an optical tracking system is used to track the position of a predetermined object. For example, the optical tracking system may be utilized to track a target in real time in equipment, such as a surgical robot.

The optical tracking system generally includes a plurality of markers attached to a target and image forming units for forming images by using light emitted by the markers, and mathematically calculates information acquired from the image forming units to thereby obtain position information or the like.

However, the conventional optical tracking system includes a plurality of markers, which increases the size of the equipment, and may be thus inappropriate in the case of tracking that requires fine precision.

Therefore, an optical tracking system, which can track the markers accurately and easily while simplifying the markers, is required.

SUMMARY

Therefore, an aspect of the present invention is to provide an optical tracking system that can track markers accurately and easily while simplifying the markers.

Another aspect of the present invention is to provide a method of calculating the posture of a marker part of an optical tracking system that can be applied to the optical tracking system above.

An optical tracking system, according to an exemplary embodiment of the present invention, includes a marker part; an image forming part; and a processing part. The marker part includes: a pattern that has particular information; and a first lens that is spaced apart from the pattern and has a first focal length. The image forming part includes: a second lens that has a second focal length; and an image forming unit that is spaced apart from the second lens and on which an image of the pattern is formed by the first lens and the second lens. The processing part determines the posture of the marker part from a coordinate conversion formula between a coordinate on the pattern surface of the pattern and a pixel coordinate on the image of the pattern, and tracks the marker part by using the determined posture of the marker part.

In an embodiment, the processing part may acquire: a first conversion matrix that converts a first coordinate corresponding to a real coordinate on the pattern surface of the pattern to a second coordinate corresponding to a three-dimensional local coordinate for the first lens of the marker part; and a second conversion matrix that converts a third coordinate corresponding to a three-dimensional local coordinate of the second coordinate for the second lens to a fourth coordinate corresponding to the pixel coordinate on the image of the pattern of the image forming part, wherein the coordinate conversion formula may be defined to convert the first coordinate to the fourth coordinate while containing the first conversion matrix and the second conversion matrix, and the processing part may acquire, from the coordinate conversion formula, a posture definition matrix that defines the posture of the marker part.

The coordinate conversion formula may be defined by the following equation, $$s \begin{bmatrix} u' \\ v' \\ 1 \end{bmatrix} = [A][R][C] \begin{bmatrix} u \\ v \\ 1 \end{bmatrix}$$

wherein $\{(u,v)$ denotes the first coordinate, $(u',v')$ denotes the fourth coordinate, $[C]$ denotes the first conversion matrix, $[A]$ denotes the second conversion matrix, $[R]$ denotes the posture definition matrix, and $s$ denotes a proportional constant$\}$.

The first conversion matrix may be defined by the following equation, $$[C] = \begin{bmatrix} 1 & 0 & -u_c \\ 0 & 1 & -v_c \\ 0 & 0 & f_b \end{bmatrix}$$

wherein $\{(u_c,v_c)$ denotes the real coordinate of the center of the pattern, and $f_b$ denotes the first focal length$\}$.

The processing part may acquire data on the first coordinate and the fourth coordinate from three or more photographed images, and may acquire calibration values of $u_c$, $v_c$, and $f_b$ by applying the acquired data to the equation below in order to thereby acquire the first conversion matrix.

The second conversion matrix may be defined by the following equation, $$[A] = \begin{bmatrix} -\dfrac{f_c}{pw} & 0 & u'_c \\ 0 & -\dfrac{f_c}{ph} & v'_c \\ 0 & 0 & 1 \end{bmatrix}$$

wherein $\{(u'_c,v'_c)$ denotes the pixel coordinate on the image of the pattern corresponding to a center of the pattern, $f_c$ denotes the second focal length, pw denotes a width of a pixel of the image of the pattern, and ph denotes a height of a pixel of the image of the pattern$\}$.

The processing part may acquire data on the first coordinate and the fourth coordinate from three or more photographed images, and may acquire calibration values of $f_c$, pw, and ph by applying the acquired data to the equation below in order to thereby acquire the second conversion matrix.

The processing part may acquire a plurality of pieces of data on the first coordinate and the fourth coordinate, and may acquire the posture definition matrix by the following equation to which the plurality of pieces of the acquired data are applied, $$[R] = [A]^{-1} \begin{bmatrix} H_1 & H_2 & H_3 \\ H_4 & H_5 & H_6 \\ H_7 & H_8 & H_9 \end{bmatrix} [C]^{-1}$$

$$\begin{bmatrix} 0 & 0 & 0 & u_1 & v_1 & -1 & u_1v'_1 & v_1v'_1 & v'_1 \\ u_1 & v_1 & 1 & 0 & 0 & 0 & u_1u'_1 & v_1u'_1 & u'_1 \\ \vdots & \vdots & \vdots & \vdots & \vdots & \vdots & \vdots & \vdots & \vdots \\ 0 & 0 & 0 & u_n & v_n & -1 & u_nv'_n & v_nv'_n & v'_n \\ u_n & v_n & 1 & 0 & 0 & 0 & u_nu'_n & v_nu'_n & u'_n \end{bmatrix} \begin{bmatrix} H_1 \\ H_2 \\ H_3 \\ H_4 \\ H_5 \\ H_6 \\ H_7 \\ H_8 \\ H_9 \end{bmatrix} = 0$$

wherein $\{(u_1,v_1), \ldots, (u_n,v_n)$ denote data of the first coordinate, and $(u'_1,v'_1), \ldots, (u'_n,v'_n)$ denote data of the fourth coordinate$\}$.

The processing part may acquire a plurality of pieces of data on the first coordinate and the fourth coordinate, and may acquire the posture definition matrix by the following equation to which the plurality of pieces of the acquired data are applied, $$[R] = \begin{bmatrix} r_{11} & r_{12} & r_{13} \\ r_{21} & r_{22} & r_{23} \\ r_{31} & r_{32} & r_{33} \end{bmatrix}$$

$$\begin{bmatrix} \frac{f_c}{pw}u_1 & \frac{f_c}{pw}v_1 & \frac{f_c}{pw}f_b & 0 & 0 & 0 & (u'_1-u'_c)v_1 & (u'_1-u'_c)v_1 & (u'_1-u'_c)f_b \\ 0 & 0 & 0 & \frac{f_c}{ph}u_1 & \frac{f_c}{ph}v_1 & \frac{f_c}{ph}f_b & (v'_1-v'_c)u_1 & (v'_1-v'_c)v_1 & (v'_1-v'_c)f_b \\ & & & & \vdots & & & & \\ \frac{f_c}{pw}u_n & \frac{f_c}{pw}v_n & \frac{f_c}{pw}f_b & 0 & 0 & 0 & (u'_n-u'_c)u_n & (u'_n-u'_c)v_n & (u'_n-u'_c)f_b \\ 0 & 0 & 0 & \frac{f_c}{ph}u_n & \frac{f_c}{ph}v_n & \frac{f_c}{ph}f_b & (v'_n-v'_c)u_n & (v'_n-v'_c)v_n & (v'_n-v'_c)f_b \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

wherein $\{(u_1,v_1), \ldots, (u_n,v_n)$ denote data of the first coordinate, $(u'_1,v'_1), \ldots, (u'_n,v'_n)$ denote data of the fourth coordinate, $(u'_c,v'_c)$ denotes the pixel coordinate on the image of the pattern corresponding to the center of the pattern, $f_c$ denotes the second focal length, pw denotes a width of a pixel of the image of the pattern, and ph denotes a height of a pixel of the image of the pattern$\}$.

Another exemplary embodiment of the present invention provides a method for calculating the posture of the marker part of an optical tracking system that includes a marker part which is configured to include a pattern that has particular information and a first lens that is spaced apart from the pattern and has a first focal length, and an image forming part that is configured to include a second lens which has a second focal length and an image forming unit that is spaced apart from the second lens and on which an image of the pattern is formed by the first lens and the second lens, and that calculates the posture of the marker part for tracking the marker part. The method for calculating the posture of the marker part of an optical tracking system may include: acquiring a first conversion matrix that converts a first coordinate corresponding to a real coordinate on the pattern surface of the pattern to a second coordinate corresponding to a three-dimensional local coordinate for the first lens of the marker part and a second conversion matrix that converts a third coordinate corresponding to a three-dimensional local coordinate of the second coordinate for the second lens to a fourth coordinate corresponding to a pixel coordinate on the image of the image forming part; and acquiring a posture definition matrix that defines the posture of the marker part from the coordinate conversion formula that converts the first coordinate to the fourth coordinate while containing the first conversion matrix and the second conversion matrix.

The coordinate conversion formula may be defined by the following equation, $$s \begin{bmatrix} u' \\ v' \\ 1 \end{bmatrix} = [A][R][C] \begin{bmatrix} u \\ v \\ 1 \end{bmatrix}$$

wherein $\{(u,v)$ denotes the first coordinate, $(u',v')$ denotes the fourth coordinate, $[C]$ denotes the first conversion matrix, $[A]$ denotes the second conversion matrix, $[R]$ denotes the posture definition matrix, and s denotes a proportional constant$\}$.

The first conversion matrix may be defined by the following equation, $$[C] = \begin{bmatrix} 1 & 0 & -u_c \\ 0 & 1 & -v_c \\ 0 & 0 & f_b \end{bmatrix}$$

wherein $\{(u_c,v_c)$ denotes the real coordinate of a center of the pattern, and $f_b$ denotes the first focal length$\}$, and the second conversion matrix may be defined by the following equation, $$[A] = \begin{bmatrix} -\frac{f_c}{pw} & 0 & u'_c \\ 0 & -\frac{f_c}{ph} & v'_c \\ 0 & 0 & 1 \end{bmatrix}$$

wherein $\{(u'_c,v'_c)$ denotes the pixel coordinate on the image of the pattern corresponding to the center of the pattern, $f_c$ denotes the second focal length, pw denotes a width of a pixel of the image of the pattern, and ph denotes a height of a pixel of the image of the pattern}.

According to the present invention, in the optical tracking system for tracking a marker part, the marker part can be miniaturized while including the pattern of particular information to enable the tracking, and the posture of the marker part can be determined by modeling the optical system of the marker part and the image forming part with the coordinate conversion formula. Therefore, it is possible to accurately track the marker part by a simpler and easier method.

DETAILED DESCRIPTION

Figure 1:
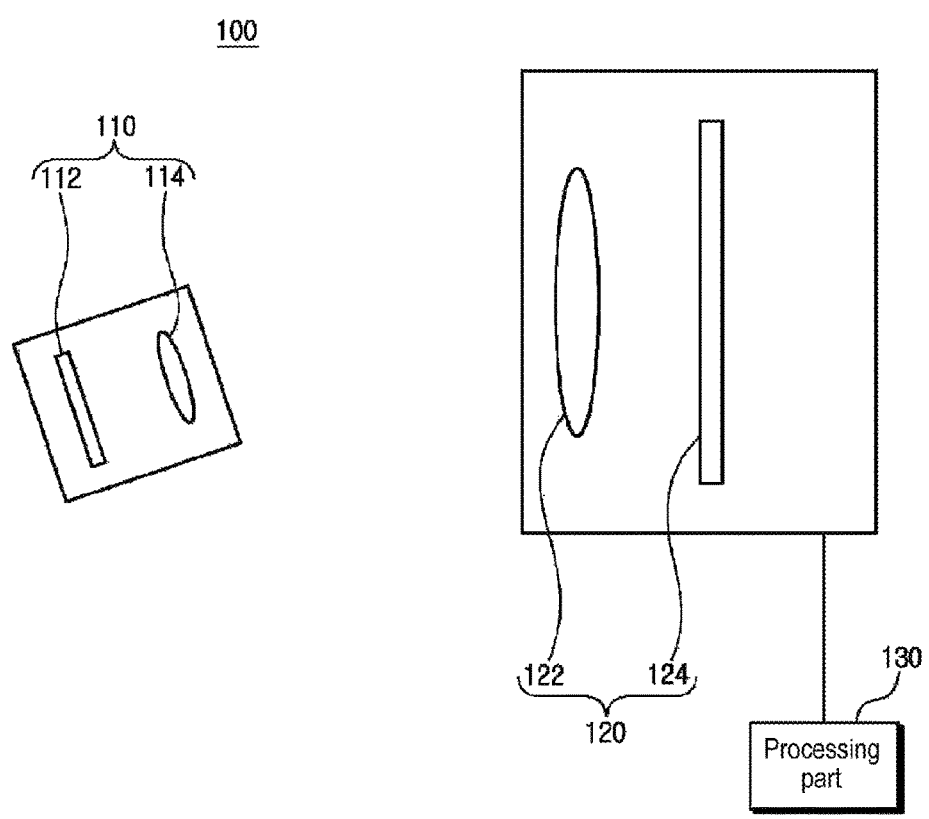
FIG. 1 is a conceptual diagram illustrating an optical tracking system, according to an embodiment of the present invention.

Although the present invention may be variously modified and may have a variety of forms, particular embodiments will be shown in the drawings and will be described in the specification. However, this is not intended to limit the present invention to particular disclosed forms, and it should be understood that the particular embodiments may encompass all modifications, equivalents, and substitutes that are included in the spirit and scope of the present invention.

Although the terms "first" or "second" may be used to describe various elements, the elements are not limited to the terms. The terms above will be used only to distinguish one element from other elements. For example, the first element may be named as the second element without departing from the scope of the present invention, and vice versa.

The terms that are used in the present specification are just intended to describe particular embodiments, and are not intended to limit the present invention. A single element expressed in the specification will be construed to encompass a plurality of elements unless the context clearly indicates otherwise. In the present specification, it should be understood that the term "include" or "have" is intended to indicate the existence of characteristics, numbers, steps, operations, elements, parts, or a combination thereof that are described in the specification, and is not intended to exclude the possibility of the existence or addition of one or more other characteristics, numbers, steps, operations, elements, parts, or a combination thereof.

Unless otherwise defined, all terms including technical and scientific terms, which are used herein, have the same meaning that is commonly understood by those skilled in the art.

The terms that are defined in the general dictionaries shall be construed to have the same meaning in the context of the related art, and shall not be construed as an ideal or excessively formal meaning unless clearly defined in the present specification.

Hereinafter, preferred embodiments of the present invention will be described in detail with reference to the accompanying drawings.

FIG. 1 is a conceptual diagram illustrating an optical tracking system, according to an embodiment of the present invention.

Referring to FIG. 1, the optical tracking system 100, according to an exemplary embodiment of the present invention, includes a marker part 110, an image forming part 120, and a processing part 130.

The marker part 110 includes a pattern 112 and a first lens 114.

The pattern 112 has particular information. For example, the particular information of the pattern may be recognized by the image forming part 120, which will be described later, for tracking, and may include one-dimensional patterns, such as bar codes, or two-dimensional patterns, such as QR codes.

The first lens 114 is spaced apart from the pattern 112, and has a first focal length. For example, the distance between the first lens 114 and the pattern 112 may be the same as the first focal length of the first lens 114 in order for the image forming part 120, which will be described later, to form an image of the pattern 112 and to track the pattern 112 from a distance. In this case, a bundle of rays with respect to the pattern 112, which pass through the first lens 114, may be parallel. The first lens 114, for example, may perform a similar function as an object lens of a microscope.

The marker part 110 may not include a light source. In this case, the marker part 110 may be utilized as a passive marker that uses light located outside of the marker part 110. On the other hand, the marker part 110 may include a light source. In this case, the marker part 110 may be utilized as an active marker that uses its own light.

The image forming part 120 includes a second lens 122 and an image forming unit 124.

The second lens 122 has a second focal length. The second lens 122, for example, may perform a similar function as an eyepiece of a microscope.

The image forming unit 124 is spaced apart from the second lens 122 and the image of the pattern 112 is formed on the image forming unit 124 by the first lens 114 and the second lens 122. For example, the distance between the image forming unit 124 and the second lens 122 may be the same as the second focal length of the second lens 122 in order to form an image for a bundle of rays with respect to the pattern 112, which pass through the first lens 114 to be parallel. For example, the image forming unit 124 may include an image sensor, such as a CCD (charge coupled device), a CMOS (complementary metal-oxide semiconductor), or the like.

The processing part 130 determines the posture of the marker part 110 from a coordinate conversion formula between the coordinate on the pattern surface of the pattern 112 and a pixel coordinate on the image of the pattern 112. The processing part 130 tracks the marker part 110 by using the determined posture of the marker part 110. The processing part 130, for example, may include a computer, or more specifically, may include a central processing unit (CPU).

Hereinafter, a system modeling process that becomes the base of functions of the processing part 130 and a process of determining the posture of the marker part 110 according thereto will be described in more detail with reference to the drawings.

Figure 2:
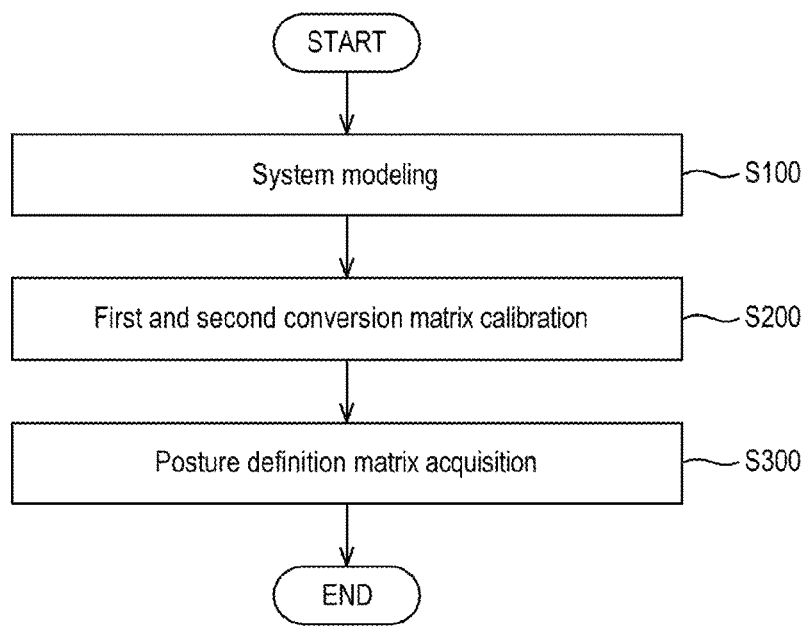
FIG. 2 is a flowchart schematically showing a problem-solving process that is necessary for the processing part of the optical tracking system of FIG. 1 in determining the posture of the marker part.

FIG. 2 is a flowchart schematically showing a problem-solving process that is necessary for the processing part of the optical tracking system of FIG. 1 in determining the posture of the marker part.

Referring to FIG. 2, the system modeling is conducted with respect to the optical tracking system 100, which has the configuration as described above (S100).

In the optical tracking system 100 as shown in FIG. 1, since the coordinate conversion between the coordinate on the pattern surface of the pattern 112 and the pixel coordinate on the image of the pattern 112 is made by the optical system of the optical tracking system 100, the coordinate conversion formula may be configured by modeling the coordinate conversion according to the optical system of the optical tracking system 100. At this time, the modeling of the coordinate conversion according to the optical system of the optical tracking system 100 may be made by each optical system of the marker part 110 and the image forming part 120 and by a relationship therebetween.

Then, in the coordinate conversion formula that is acquired as a result of the system modeling, the first and second conversion matrices, which will be described later, are calibrated (S200).

When defining the coordinate on the pattern surface of the pattern 112 shown in FIG. 1 as the first coordinate, the three-dimensional coordinate of the first coordinate for the first lens 114 as the second coordinate, the three-dimensional coordinate of the second coordinate for the second lens 122 as the third coordinate, and the pixel coordinate on the image of the pattern 112 of the image forming part 120 as the fourth coordinate, the first conversion matrix converts the first coordinate to the second coordinate, and the second conversion matrix converts the third coordinate to the fourth coordinate.

Although the coordinate conversion formula acquired as a result of the system modeling is determined as the equation of various parameters of the optical systems of the marker part 110 and the image forming part 120 shown in FIG. 1, the parameters may not be accurately acquired or values thereof may vary with the mechanical arrangement state. Therefore, a more accurate system modeling can be made by calibrating the first conversion matrix and the second conversion matrix.

Next, a posture definition matrix is acquired by using the calibration result (S300).

Here, the posture refers to the direction in which the marker part 110 faces, and the posture definition matrix provides information about the posture of the marker part 110 so that roll, pitch, and yaw of the marker part 110 may be recognized from the posture definition matrix.

Hereinafter, each operation of FIG. 2 will be described in more detail with reference to the drawings.

Figure 3:
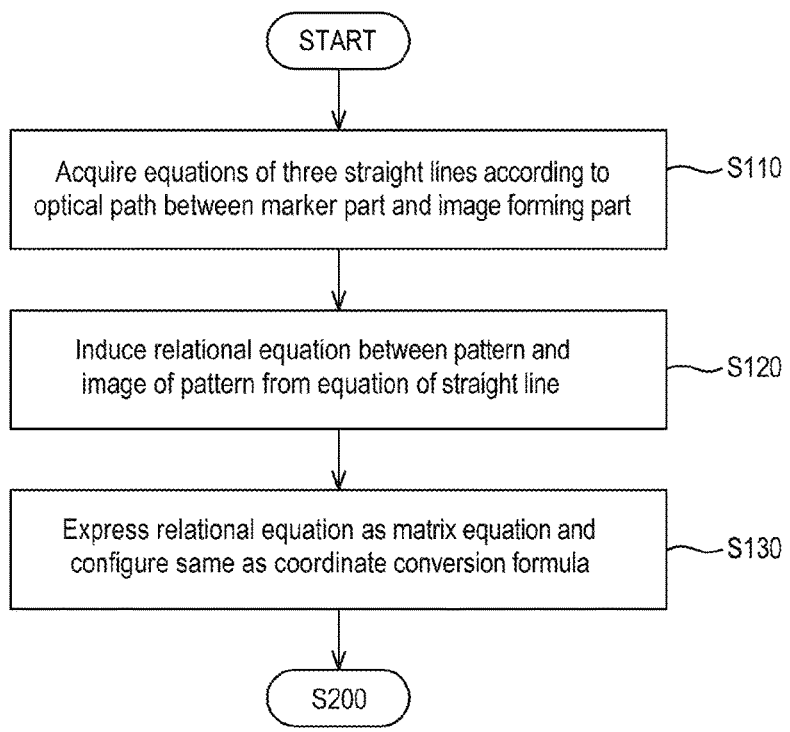
FIG. 3 is a flowchart illustrating a process of system modeling in the problem-solving process of FIG. 2.
Figure 4:
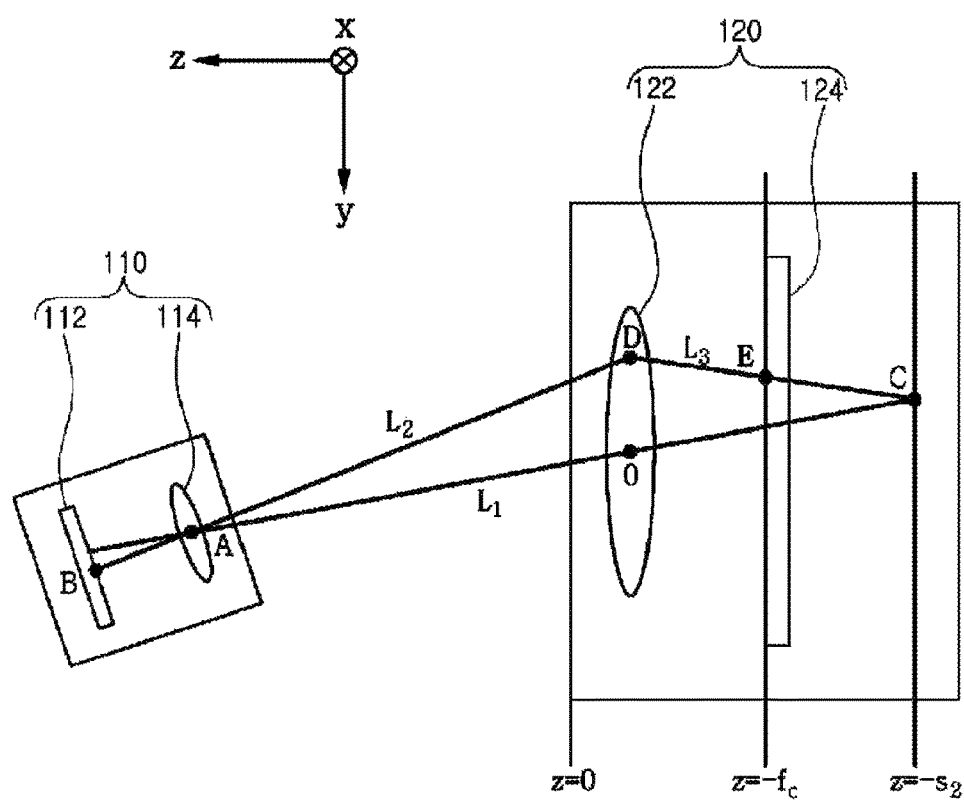
FIG. 4 is a conceptual diagram for explaining the process of system modeling in FIG. 3.

FIG. 3 is a flowchart illustrating a process of system modeling in the problem-solving process of FIG. 2, and FIG. 4 is a conceptual diagram for explaining the process of system modeling in FIG. 3.

Referring to FIGS. 3 and 4, first, equations for three straight lines are acquired according to optical paths between the marker part 110 and the image forming part 120 (S110).

More specifically, the central point of the first lens 114 is referred to as the first central point A and the central point of the second lens 122 is referred to as the second central point O, while point B refers to a certain point on the pattern 112. A ray with respect to a certain point B passes straight through the first central point A of the first lens 114, and the ray that has passed through the first central point A reaches the second lens 122 at point D. Then, the ray is refracted by the second lens 122 at the point D to then form an image on the image forming unit 124 at point E. In addition, a ray passes straight through the first central point A of the first lens 114 and the second central point O of the second lens 122 to then meet the extension line of the line segment DE at point C.

At this time, the linear equation for the line segment AO (or the line segment AC), the linear equation for the line segment AD, and the linear equation for the line segment DC are defined as L1, L2, and L3, respectively, as shown in FIG. 4.

In a world coordinate system, the coordinate of the first central point A is configured as (X,Y,Z), and the coordinate of the second central point O is configured as the origin (0,0,0). Since the coordinate of the second central point O of the second lens 122 is configured as the origin (0,0,0), the three-dimensional local coordinate system for the second lens 122 is the same as the world coordinate system.

In addition, the coordinate of a certain point (corresponding to the point B) on the pattern 112 is configured as (u,v), and the coordinate of the central point of the pattern 112 is configured as $(u_c,v_c)$. Further, the coordinate of a pixel of the image (corresponding to the point E) of the pattern 112, which is formed on the image forming unit 124, is configured as (u',v'). The coordinates (u,v) and $(u_c,v_c)$, for example, may be configured based on the left upper side of pattern 112, and the coordinate (u',v'), for example, may be configured based on the left upper side of the image of pattern 112.

Meanwhile, when the image forming part 120 is positioned in the focal length $f_c$ of the second lens 122, the z-axis coordinate of the image forming unit 124 may be $-f_c$.

The equations of the three straight lines may be acquired in sequence by using information above.

The equation of the straight line L1 is acquired from the line segment AO, and the position of the point C is acquired from the same. The equation of the straight line L2 is acquired from the line segment AB, and the position of the point D is acquired from the same. The equation of the straight line L3 is acquired from the line segment DC. At this time, since the world coordinates of the point A and the point O are given, the equations of the three straight lines may be obtained by recognizing only the world coordinate of the point B.

When the posture definition matrix for defining the posture of the marker part 110 is defined as a 3*3 matrix [R] and the components of the matrix [R] are defined as $r_{11}, r_{12}, r_{13}, r_{21}, r_{22}, r_{23}, r_{31}, r_{32}$, and $r_{33}$, respectively, the world coordinate of the point B may be determined as $(r_{11}u+r_{12}v+r_{13}f_b+X, r_{21}u+r_{22}v+r_{23}f_b+Y, r_{31}u+r_{32}v+r_{33}f_b+Z)$ that is converted from the pattern coordinate (u,v) of the point B based on the matrix [R] and the focal length $f_b$ of the first lens 114.

Accordingly, it is possible to acquire the equations of the three straight lines from the world coordinates of the points A, O, and B.

Subsequently, the relational equation between the pattern 112 and the image of the pattern 112 is induced from the acquired equations of the three straight lines (S120).

The position of the point E (the world coordinate of the point E) may be acquired from the equation of the straight line L3 obtained above so that the pixel coordinate (u',v') of the point E may be obtained from the same.

According to this, since the pixel coordinate (u',v') of the point E may be expressed as the coordinate (u,v) on the pattern of the point B, the relational equation between the pattern 112 and the image of the pattern corresponding to the point E may be determined.

Next, the relational equation is expressed as a matrix equation in order to thereby configure the same as the coordinate conversion formula (S130).

The relational equation may be expressed as a matrix equation as shown in Equation 1 below, and such a matrix equation for the coordinate conversion may be configured as the coordinate conversion formula.

$$s \begin{bmatrix} u'_i \\ v'_i \\ 1 \end{bmatrix} = [A][R][C] \begin{bmatrix} u_i \\ v_i \\ 1 \end{bmatrix}$$
(Equation 1)

$$= \begin{bmatrix} -\frac{f_c}{pw.} & 0 & u'_c \\ 0 & -\frac{f_c}{ph.} & v'_c \\ 0 & 0 & 1 \end{bmatrix} \begin{bmatrix} r_{11} & r_{12} & r_{13} \\ r_{21} & r_{22} & r_{23} \\ r_{31} & r_{32} & r_{33} \end{bmatrix} \begin{bmatrix} 1 & 0 & -u_c \\ 0 & 1 & -v_c \\ 0 & 0 & f_b \end{bmatrix} \begin{bmatrix} u_i \\ v_i \\ 1 \end{bmatrix}$$

$(s = r_{31}u_i + r_{32}v_i + r_{33}f_b)$

Here, (u,v) denotes the first coordinate, (u',v') denotes the fourth coordinate, [C] refers to the first conversion matrix, [A] refers to the second conversion matrix, [R] refers to the posture definition matrix, ($u_c$,$v_c$) denotes the coordinate of the center of the pattern on the pattern surface, $f_b$ denotes the first focal length, $f_c$ denotes the second focal length, pw denotes the width of a pixel of the image of the pattern, ph denotes the height of a pixel of the image of the pattern, and i of ($u_i$,$v_i$) and ($u'_i$,$v'_i$) indicates the predetermined i-th pattern.

It can be seen that the coordinate conversion formula is made by the product of the first and second conversion matrices, which are described in FIG. 1, and the posture definition matrix.

More specifically, as described in FIG. 1, when defining the real coordinate on the pattern surface of the pattern 112 as the first coordinate (u,v), the three-dimensional local coordinate of the first coordinate for the first lens 114 as the second coordinate, the three-dimensional local coordinate (equal to the world coordinate) of the second coordinate for the second lens 122 as the third coordinate, and the pixel coordinate on the image of the pattern 112 of the image forming part 120 as the fourth coordinate (u',v'), it can be seen that the coordinate conversion formula is conceptually expressed as [A][R][C], which is the product of the first conversion matrix [C] for converting the first coordinate to the second coordinate, the posture definition matrix [R] for converting the second coordinate to the third coordinate, and the second conversion matrix [A] for converting the third coordinate to the fourth coordinate.

Next, the operation S200 of calibrating the first and second conversion matrices in the coordinate conversion formula that is acquired as a result of the system modeling will be described in more detail with reference to the drawings.

The calibration is carried out first with respect to the second conversion matrix, and is then carried out with respect to the first conversion matrix.

Figure 5:
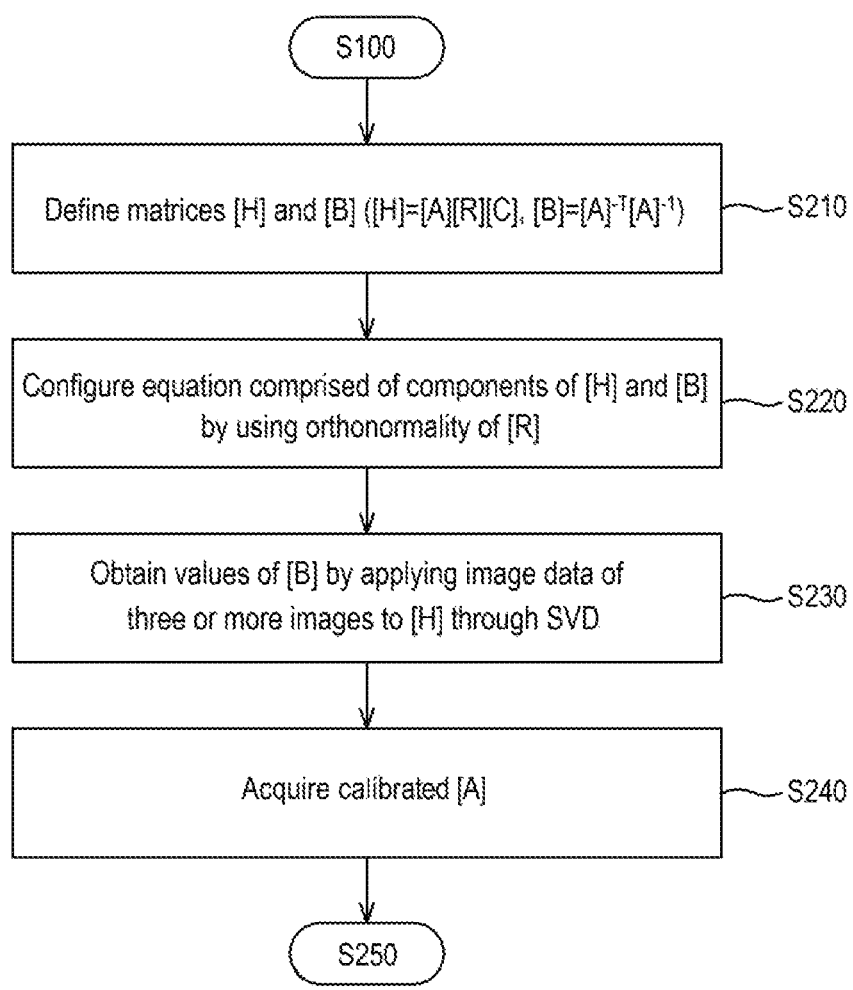
FIG. 5 is a flowchart illustrating a process of calibrating a second conversion matrix in the problem-solving process of FIG. 2.

FIG. 5 is a flowchart illustrating a process of calibrating the second conversion matrix in the problem-solving process of FIG. 2.

Referring to FIG. 5, first, a matrix [B] and a matrix [H] are defined to facilitate the mathematical analysis for the calibration (S210).

More specifically, the matrix [B] may be defined by using the second conversion matrix [A] as shown in Equation 2, and the matrix [H] may be defined by using the first conversion matrix [C], the second conversion matrix [A], and the posture definition matrix [R] as shown in Equation 3.

$[B]=[A]^{-T}*[A]^{-1}$ (Equation 2)

$[H]=[A][R][C]$ (Equation 3)

Here, all of the matrixes [A], [B], [C], [H], and [R] are in the form of a 3*3 matrix, and it may be expressed that [H]=[h1,h2,h3] and [R]=[r1,r2,r3].

Equation 4 is obtained by multiplying both sides of Equation 3 by $A^{-1}$.

$A^{-1}[h_1 h_2 h_3]=[r_1 r_2 T]$ (Equation 4)

Then, the equation comprised of the components of [H] and [B] is configured by using the orthonormality of the matrix [R] (S220).

More specifically, the matrix [B] may be defined as shown in Equation 5 by using the orthonormality of the posture definition matrix [R] corresponding to a rotation matrix.

$$[B] = \begin{bmatrix} \frac{1}{\alpha^2} & 0 & -\frac{u'_c}{\alpha^2} \\ 0 & \frac{1}{\beta^2} & -\frac{v'_c}{\beta^2} \\ -\frac{u'_c}{\alpha^2} & -\frac{v'_c}{\beta^2} & \frac{u'^2_c}{\alpha^2} + \frac{v'^2_c}{\beta^2} + 1 \end{bmatrix} = \begin{bmatrix} B_{11} & 0 & B_{13} \\ 0 & B_{22} & B_{23} \\ B_{13} & B_{23} & B_{33} \end{bmatrix}$$
(Equation 5)

Here, $\alpha=-f_c/pw$, $\beta=-f_c/ph$, $f_c$ refers to the focal length of the second lens 122 of the image forming part 120, and Pw and ph refer to the width and the height of a pixel, respectively.

Column vectors b and $v_{ij}$ are defined as shown in Equation 6 by using non-zero components of the matrix [B].

$b=[B_{11} B_{22} B_{13} B_{23} B_{33}]^T$ $v_{ij}=[h_{i1}h_{j1}, h_{i2}h_{j2}, h_{i3}h_{j1}+h_{i1}h_{j3}, h_{i3}h_{j2}+h_{i2}h_{j3}, h_{i3}h_{j3}]^T$ (Equation 6)

Equation 7 may be acquired by using the orthonormality of the matrix [R] with respect to Equation 6.

$$\begin{bmatrix} v_{12}^T \\ (v_{11} - v_{22})^T \end{bmatrix} b = 0 \qquad \text{(Equation 7)}$$

$$[h_{11}h_{21}, h_{12}h_{22}, h_{13}h_{21}+h_{11}h_{23}, h_{13}h_{22}+h_{12}h_{23}, h_{13}h_{23}]$$
$$[h_{11}h_{11}-h_{21}h_{21}, h_{12}h_{12}-h_{22}h_{22}, h_{13}h_{11}+h_{11}h_{13}-(h_{23}h_{21}+h_{21}h_{23}), h_{13}h_{12}+h_{12}h_{13}-(h_{23}h_{22}+h_{22}h_{23}), h_{13}h_{13}-h_{23}h_{23}]$$

$$\begin{bmatrix} B_{11} \\ B_{22} \\ B_{13} \\ B_{23} \\ B_{33} \end{bmatrix} = 0$$

Next, values of the matrix [B] are obtained by applying data on three or more images to the matrix [H] (S230).

More specifically, after applying three or more images to Equation 7, the column vector b may be obtained by using a method such as singular value decomposition (SVD). Once the column vector b is obtained, all components of the matrix [B] may be recognized.

Next, the calibrated matrix [A] is eventually acquired (S240).

More specifically, when all components of the matrix [B] are given, $v'_c$, $\alpha$, $\beta$, and $u'_c$ may be obtained through Equation 8 ($\lambda$ and $\gamma$ are expressed as parameters).

$$v'_c = \frac{B_{12}B_{13} - B_{11}B_{23}}{B_{11}B_{22} - B_{12}^2} \qquad \text{(Equation 8)}$$

$$\alpha = \sqrt{\frac{\lambda}{B_{11}}}, \quad \beta = \sqrt{\frac{\lambda B_{11}}{B_{11}B_{22} - B_{12}^2}}$$

$$u'_c = \frac{\gamma v'_c}{\beta} - \frac{B_{13}\alpha^2}{\lambda}$$

$$\lambda = B_{33} - \frac{[B_{13}^2 + v'_c(B_{12}B_{13} - B_{11}B_{23})]}{B_{11}}$$

$$\gamma = -B_{12}\alpha^2\beta/\lambda$$

Therefore, all components of the matrix [A] may be obtained from Equation 9.

$$[A] = \begin{bmatrix} \alpha & 0 & u'_c \\ 0 & \beta & v'_c \\ 0 & 0 & 1 \end{bmatrix}; \left(\alpha = -\frac{f_c}{pw}, \beta = -\frac{f_c}{ph}\right) \qquad \text{(Equation 9)}$$

Next, the calibration of the first conversion matrix [C] is made by using the second conversion matrix [A] that has been previously calibrated.

Figure 6:
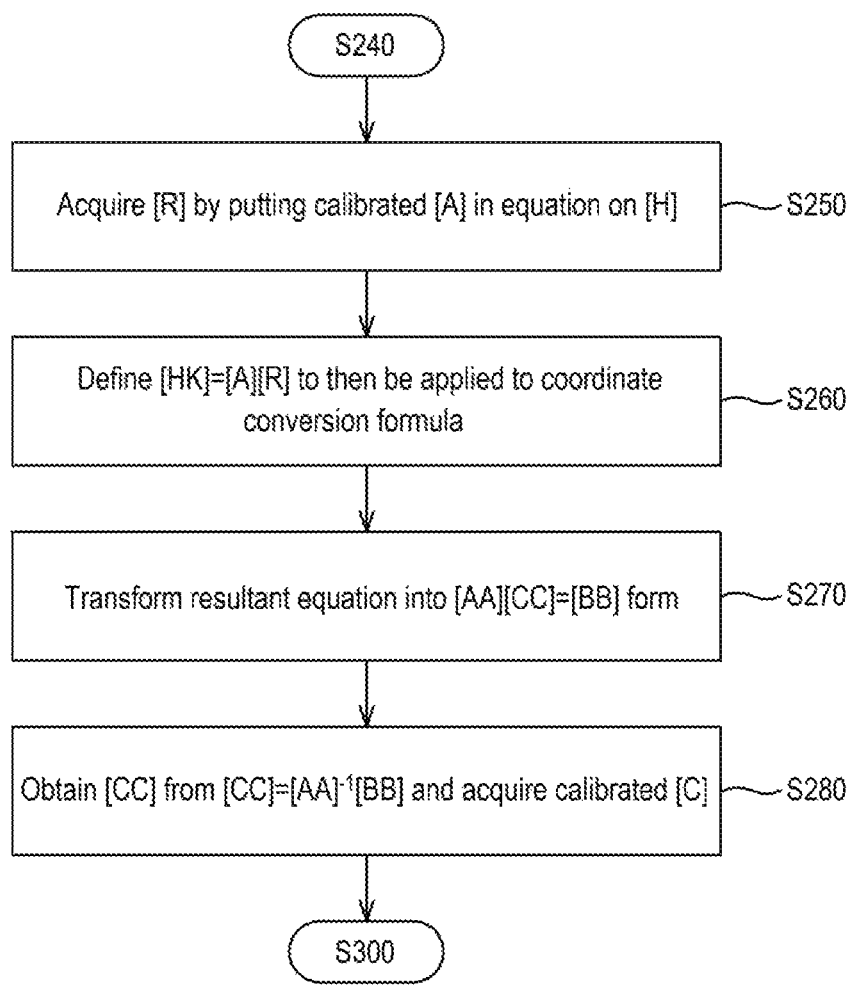
FIG. 6 is a flowchart illustrating a process of calibrating a first conversion matrix in the problem-solving process of FIG. 2.

FIG. 6 is a flowchart illustrating a process of calibrating the first conversion matrix in the problem-solving process of FIG. 2.

Referring to FIG. 6, the matrix [R] is obtained by putting the calibrated matrix [A] in the equation on matrix [H] (S250).

More specifically, Equation 10 is acquired by putting the second conversion matrix [A] of Equation 9 in Equation 3 and by calculating [R][C] of Equation 1.

$$[H] = [A][R][C] \qquad \text{(Equation 10)}$$
$$= [A][RC]$$

$$= \begin{bmatrix} \alpha & 0 & u'_c \\ 0 & \beta & v'_c \\ 0 & 0 & 1 \end{bmatrix} \begin{bmatrix} r_{11} & r_{12} & -u_c r_{11} - v_c - \\ & & u_c r_{12} + f_b r_{13} \\ r_{21} & r_{22} & -u_c r_{21} - v_c - \\ & & u_c r_{22} + f_b r_{23} \\ r_{31} & r_{32} & -u_c r_{31} - v_c - \\ & & u_c r_{32} + f_b r_{33} \end{bmatrix}$$

$$= [h_1 \quad h_2 \quad h_3]$$

If the matrix [R] is replaced by [R]=[r1 r2 r3] in Equation 10, [R] may be obtained for each column vector component from Equation 11.

$$r_1 = [A]^{-1}h_1, r_2 = [A]^{-1}h_2, r_3 = r_1 \times r_2 \qquad \text{(Equation 11)}$$

Subsequently, a matrix [HK] is defined as [HK]=[A][R] to then be applied to the coordinate conversion formula (S260).

More specifically, the product of the matrix [A] and the matrix [R] is defined as the matrix [HK] to then be applied to the coordinate conversion formula of Equation 1 to have the components of the matrix [HK] and the matrix [C].

At this time, the matrix [HK] may be obtained by using the matrix [A] that is acquired in Equation 9 and the matrix [R] that is acquired in Equation 11, and may be applied to the coordinate conversion formula of Equation 1 in order to thereby acquire Equation 12, which comprises of the components of the matrix [HK] and the matrix [C].

$$s\begin{bmatrix} u' \\ v' \\ 1 \end{bmatrix} = [A][R][C]\begin{bmatrix} u \\ v \\ 1 \end{bmatrix} = \qquad \text{(Equation 12)}$$

$$[HK][C]\begin{bmatrix} u \\ v \\ 1 \end{bmatrix} = [HK]\begin{bmatrix} 1 & 0 & -u_c \\ 0 & 1 & -v_c \\ 0 & 0 & f_b \end{bmatrix}\begin{bmatrix} u \\ v \\ 1 \end{bmatrix}$$

Next, the resultant equation is transformed into a form of [AA][CC]=[BB] (S270).

More specifically, the matrix comprised of only the components of the matrix [C] is defined as [CC] and is separated from the resultant equation in order to thereby transform the same into a form of [AA][CC]=[BB]. At this time, since the matrix [HK] is known, the matrix [AA], the matrix [BB], and the matrix [CC] may be defined as shown in Equation 13 by using the matrix [HK].

$$[AA] = \begin{bmatrix} HK(2,1) - HK(3,1)v'_i & HK(2,2) - HK(3,2)v'_i & -HK(2,3) + HK(3,3)v'_i \\ -HK(1,1) + HK(3,1)u'_i & -HK(1,2) + HK(3,2)u'_i & HK(1,3) - HK(3,3)u'_i \end{bmatrix}$$ (Equation 13)

$$[BB] = \begin{bmatrix} HK(2,1)u_i + HK(2,2)v_i - HK(3,1)v'_i u_i - HK(3,2)v'_i v_i \\ -HK(1,1)u_i - HK(1,2)v_i + HK(3,1)u'_i u_i + HK(3,2)u'_i v_i \end{bmatrix}$$

$$[CC] = \begin{bmatrix} u_c \\ v_c \\ f_b \end{bmatrix}$$

Then, [CC] is obtained from $[CC]=[AA]^{-1}[BB]$ in order to thereby acquire the matrix [C] that is calibrated (S280).

More specifically, the components of [CC] are acquired from $[CC]=[AA]^{-1}[BB]$ that is transformed from the equation $[AA][CC]=[BB]$ to finally obtain the first conversion matrix [C] that is calibrated.

Next, the operation S300 of acquiring the posture definition matrix by using the first and second conversion matrices, which have been calibrated, will be described in more detail with reference to the drawings.

Figure 7:
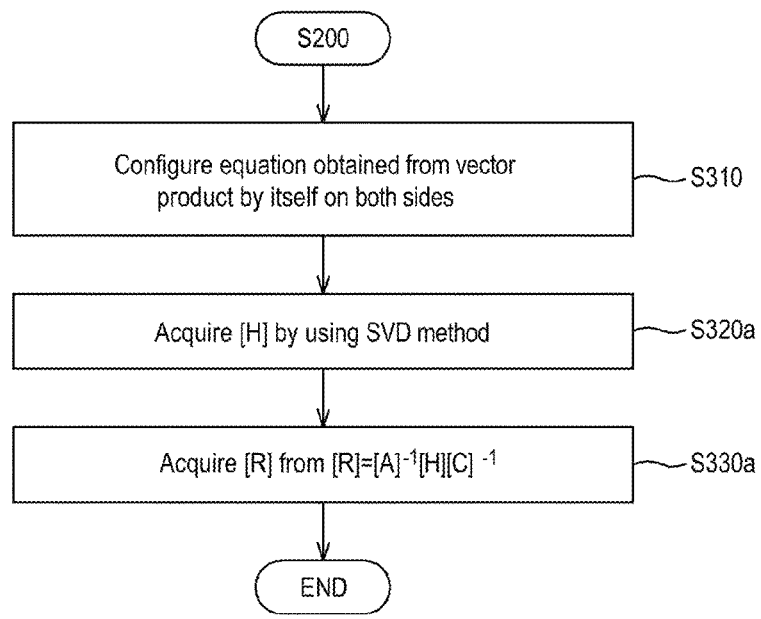
FIG. 7 is a flowchart illustrating an example of a process of acquiring a posture definition matrix in problem-solving process of FIG. 2.

FIG. 7 is a flowchart illustrating an example of a process for acquiring a posture definition matrix in problem-solving process of FIG. 2.

Referring to FIG. 7, as an example for obtaining the posture definition matrix [R], first, an equation, which is obtained from the vector product by itself with respect to both sides thereof, is configured (S310).

More specifically, since the vector product of Equation 1 by itself on both sides thereof results in zero, Equation 14 may be acquired by configuring the same as an equation.

$$\begin{bmatrix} u'_i \\ v'_i \\ 1 \end{bmatrix} \times \begin{bmatrix} u'_i \\ v'_i \\ 1 \end{bmatrix} = \begin{bmatrix} 0 & -1 & v'_i \\ 1 & 0 & -u'_i \\ -v'_i & u'_i & 0 \end{bmatrix} [A][R][C] \begin{bmatrix} u_i \\ v_i \\ 1 \end{bmatrix} = 0$$ (Equation 14)

Next, the matrix [H] is acquired by using such a method as singular value decomposition (SVD) (S320*a*).

More specifically, [H]=[A][R][C] of Equation 3 is applied to Equation 14 to then make an equation with respect to the components (H1, H2, ..., H9) of the matrix [H] in order to thereby obtain Equation 15.

$$\begin{bmatrix} 0 & 0 & 0 & u_1 & v_1 & -1 & u_1 v'_1 & v_1 v'_1 & v'_1 \\ u_1 & v_1 & 1 & 0 & 0 & 0 & u_1 u'_1 & v_1 u'_1 & u'_1 \\ \vdots & \vdots & \vdots & \vdots & \vdots & \vdots & \vdots & \vdots & \vdots \\ 0 & 0 & 0 & u_n & v_n & -1 & u_n v'_n & v_n v'_n & v'_n \\ u_n & v_n & 1 & 0 & 0 & 0 & u_n u'_n & v_n u'_n & u'_n \end{bmatrix} \begin{bmatrix} H_1 \\ H_2 \\ H_3 \\ H_4 \\ H_5 \\ H_6 \\ H_7 \\ H_8 \\ H_9 \end{bmatrix} = 0$$ (Equation 15)

Using a method such as singular value decomposition (SVD), 2n equations of Equation 15 are acquired.

Next, [R] is obtained from $[R]=[A]^{-1}[H][C]^{-1}$ (S330*a*).

More specifically, [R] is obtained from $[R]=[A]^{-1}[H][C]^{-1}$ that is transformed from [H]=[A][R][C] of Equation 3.

The posture definition matrix may be obtained by other methods.

Figure 8:
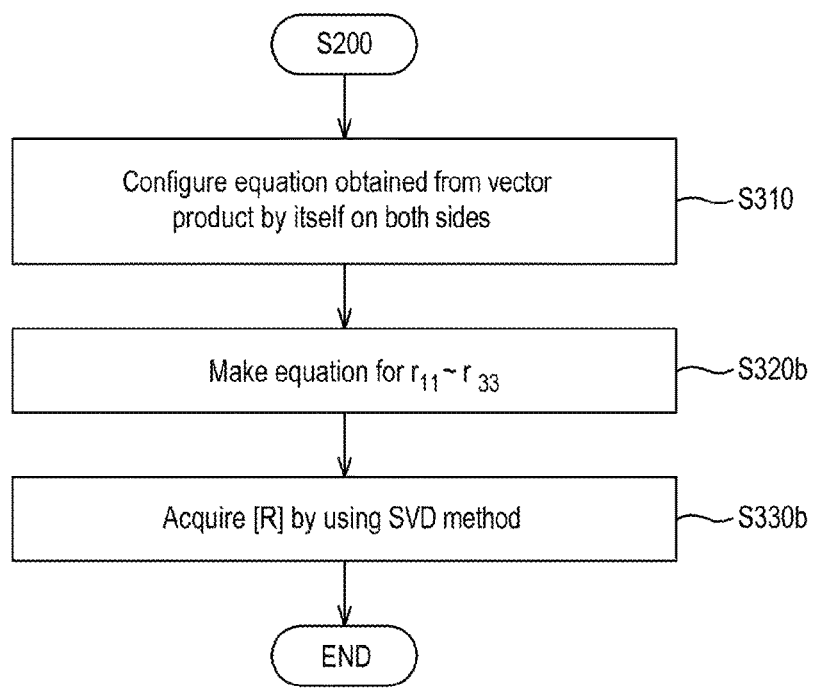
FIG. 8 is a flowchart illustrating another example of a process of acquiring a posture definition matrix in problem-solving process of FIG. 2.

FIG. 8 is a flowchart illustrating another example of a process for acquiring a posture definition matrix in problem-solving process of FIG. 2.

Referring to FIG. 8, as another example for obtaining the posture definition matrix [R], first, an equation, which is obtained from the vector product by itself with respect to both sides thereof (S310), is configured. This operation is the same as that of FIG. 7, so that duplicate description thereof will be omitted.

Subsequently, the equation is rewritten as an equation for $r_{11} \sim r_{33}$ (S320*b*).

More specifically, the equation with respect to each component $r_{11}$, $r_{12}$, $r_{13}$, $r_{21}$, $r_{22}$, $r_{23}$, $r_{31}$, $r_{32}$, or $r_{33}$ of the posture definition matrix [R] is made from Equation 14 in order to thereby acquire Equation 16.

$$\begin{bmatrix} \frac{f_c}{pw}u_1 & \frac{f_c}{pw}v_1 & \frac{f_c}{pw}f_b & 0 & 0 & 0 & (u'_1-u'_c)u_1 & (u'_1-u'_c)v_1 & (u'_1-u'_c)f_b \\ 0 & 0 & 0 & \frac{f_c}{ph}u_1 & \frac{f_c}{ph}v_1 & \frac{f_c}{ph}f_b & (v'_1-v'_c)u_1 & (v'_1-v'_c)v_1 & (v'_1-v'_c)f_b \\ & & & & \vdots & & & & \\ \frac{f_c}{pw}u_n & \frac{f_c}{pw}v_n & \frac{f_c}{pw}f_b & 0 & 0 & 0 & (u'_n-u'_c)u_n & (u'_n-u'_c)v_n & (u'_n-u'_c)f_b \\ 0 & 0 & 0 & \frac{f_c}{ph}u_n & \frac{f_c}{ph}v_n & \frac{f_c}{ph}f_b & (v'_n-v'_c)u_n & (v'_n-v'_c)v_n & (v'_n-v'_c)f_b \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$ (Equation 16)

Next, the matrix [R] is obtained by using a method such as singular value decomposition (SVD) (S330b).

More specifically, 2n equations of Equation 16 are acquired by using a method such as singular value decomposition (SVD).

As described above, [R] is finally obtained.

The posture of the marker part 110 may be calculated by applying the system modeling process and the method for acquiring the posture definition matrix [R] described above to the optical tracking system 100 shown in FIG. 1.

Hereinafter, the method of calculating the posture of the marker part 110 by the processing part 130 will be described in more detail with reference to the drawings.

Figure 9:
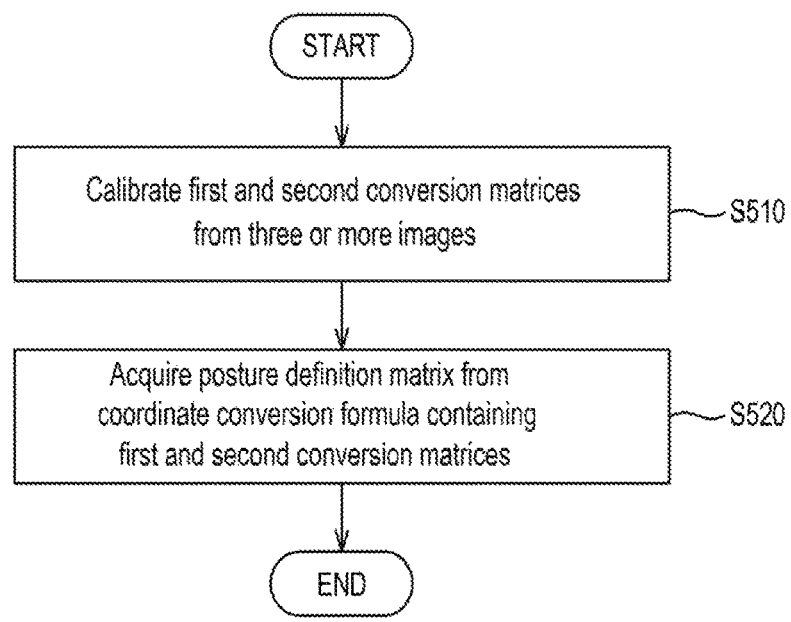
FIG. 9 is a flowchart illustrating a method of calculating the posture of a marker part of an optical tracking system, according to an embodiment of the present invention.

FIG. 9 is a flowchart illustrating a method of calculating the posture of the marker part of the optical tracking system, according to an embodiment of the present invention.

Referring to FIG. 9, first, the processing part 130 calibrates the first and second conversion matrices from three or more images (S510).

The calibration may be substantially the same as operation S200 described in FIG. 2 and operations S210 to S280 described in detail in FIGS. 5 and 6. The processing part 130 may calibrate the first and second conversion matrices by using only the final equation for the calibration as in operations S230 and S280 among the operations above.

Next, the posture definition matrix is acquired from the coordinate conversion formula that contains the first and second conversion matrices (S520).

The acquisition of the posture definition matrix may be substantially the same as operation S300 described in FIG. 2, operations S310 to S330a, and operations S310 to S330b described in detail in FIGS. 7 and 8. The processing part 130 may acquire the posture definition matrix by using only the final equation for the acquisition of the posture definition matrix as in operation S320a and S320b among the operations above.

Accordingly, the processing part 130 may acquire the first conversion matrix for converting the first coordinate to the second coordinate and the second conversion matrix for converting the third coordinate to the fourth coordinate through the calibration in advance, and may acquire the posture definition matrix for defining the posture of the marker part 110 from the coordinate conversion formula.

Once the posture definition matrix is acquired, the posture of the marker part 110 may be recognized. For example, the roll, pitch, and yaw of the marker part 110 may be recognized from the posture definition matrix.

According to the optical tracking system described above, the marker part can be miniaturized while including a pattern of particular information to enable tracking, and the posture of the marker part can be determined by modeling the optical systems of the marker part and the image forming part with the coordinate conversion formula. Therefore, it is possible to accurately track the marker part by a simpler and easier method.

Although the preferred embodiments of the invention have been described in the detailed description of the invention, those skilled in the art or those who have ordinary knowledge in the art may modify and change the present invention in various manners without departing from the spirit and scope of the present invention in the claims below. Therefore, the description above and the drawing below should be construed to show only examples of the present invention without limiting the technical concept of the present invention.

| (Reference Numerals) | |
| --- | --- |
| 100: Optical tracking system | 110: Marker part |
| 112: Pattern | 114: First lens |
| 120: Image forming part | 122: Second lens |
| 124: Image forming unit | 130: Processing part |

What is claimed is:

1. An optical tracking system comprising:
a marker configured to include a pattern that has particular information and a first lens that is spaced apart from the pattern and has a first focal length;
an image lens and sensor combination configured to include a second lens that has a second focal length and an imaging sensor that is spaced apart from the second lens and on which an image of the pattern is formed by the first lens and the second lens; and
a processor configured to determine a posture of the marker from a coordinate conversion formula between a coordinate on the pattern surface of the pattern and a pixel coordinate on the image of the pattern and configured to track the marker by using the determined posture of the marker,
wherein the processor acquires: a first conversion matrix that converts a first coordinate corresponding to the coordinate on the pattern surface of the pattern to a second coordinate corresponding to a three-dimensional coordinate for the first lens of the marker; and a second conversion matrix that converts a third coordinate corresponding to a three-dimensional coordinate of the second coordinate for the second lens to a fourth coordinate corresponding to the pixel coordinate on the image of the pattern of the image lens and sensor combination,
wherein the coordinate conversion formula is defined to convert the first coordinate to the fourth coordinate while including the first conversion matrix and the second conversion matrix, and
wherein the processor acquires, from the coordinate conversion formula, a posture definition matrix that defines the posture of the marker.

2. The optical tracking system according to claim 1, wherein the coordinate conversion formula is defined by the following equation, $$s \begin{bmatrix} u' \\ v' \\ 1 \end{bmatrix} = [A][R][C] \begin{bmatrix} u \\ v \\ 1 \end{bmatrix}$$

{(u,v) denotes the first coordinate, (u',v') denotes the fourth coordinate, [C] denotes the first conversion matrix, [A] denotes the second conversion matrix, [R] denotes the posture definition matrix, and s denotes a proportional constant}.

3. The optical tracking system according to claim 2, wherein the first conversion matrix is defined by the following equation, $$[C] = \begin{bmatrix} 1 & 0 & -u_c \\ 0 & 1 & -v_c \\ 0 & 0 & f_b \end{bmatrix}$$

{$(u_c, v_c)$ denotes a coordinate of a center of the pattern and $f_b$ denotes the first focal length}.

4. The optical tracking system according to claim 3, wherein the processor acquires the first conversion matrix by acquiring calibration values of $u_c$, $v_c$, and $f_b$ from three or more photographed images.

5. The optical tracking system according to claim 2, wherein the second conversion matrix is defined by the following equation, $$[A] = \begin{bmatrix} -\dfrac{f_c}{pw} & 0 & u'_c \\ 0 & -\dfrac{f_c}{ph} & v'_c \\ 0 & 0 & 1 \end{bmatrix}$$

{$(u'_c, v'_c)$ denotes the pixel coordinate on the image of the pattern corresponding to a center of the pattern, $f_c$ denotes the second focal length, pw denotes a width of a pixel of the image of the pattern, and ph denotes a height of a pixel of the image of the pattern}.

6. The optical tracking system according to claim 5, wherein the processor acquires the second conversion matrix by acquiring calibration values of $f_c$, pw, and ph from three or more photographed images.

7. The optical tracking system according to claim 2, wherein the processor acquires a plurality of pieces of data on the first coordinate and the fourth coordinate, and acquires the posture definition matrix by the following equation to which the plurality of pieces of the acquired data are applied, $$[R] = [A]^{-1} \begin{bmatrix} H_1 & H_2 & H_3 \\ H_4 & H_5 & H_6 \\ H_7 & H_8 & H_9 \end{bmatrix} [C]^{-1}$$

-continued $$\begin{bmatrix} 0 & 0 & 0 & u_1 & v_1 & -1 & u_1 v'_1 & v_1 v'_1 & v'_1 \\ u_1 & v_1 & 1 & 0 & 0 & 0 & u_1 u'_1 & v_1 u'_1 & u'_1 \\ \vdots & \vdots & \vdots & \vdots & \vdots & \vdots & \vdots & \vdots & \vdots \\ 0 & 0 & 0 & u_n & v_n & -1 & u_n v'_n & v_n v'_n & v'_n \\ u_n & v_n & 1 & 0 & 0 & 0 & u_n u'_n & v_n u'_n & u'_n \end{bmatrix} \begin{bmatrix} H_1 \\ H_2 \\ H_3 \\ H_4 \\ H_5 \\ H_6 \\ H_7 \\ H_8 \\ H_9 \end{bmatrix} = 0$$

{$(u_1, v_1), \ldots, (u_n, v_n)$ denote data of the first coordinate and $(u'_1, v'_1), \ldots, (u'_n, v'_n)$ denote data of the fourth coordinate}.

8. The optical tracking system according to claim 2, wherein the processor acquires a plurality of pieces of data on the first coordinate and the fourth coordinate, and acquires the posture definition matrix by the following equation to which the plurality of pieces of the acquired data are applied, $$[R] = \begin{bmatrix} r_{11} & r_{12} & r_{13} \\ r_{21} & r_{22} & r_{23} \\ r_{31} & r_{32} & r_{33} \end{bmatrix}$$

$$\begin{bmatrix} \dfrac{f_c}{pw} u_1 & \dfrac{f_c}{pw} v_1 & \dfrac{f_c}{pw} f_b & 0 & 0 & 0 & (u'_1 - u'_c)u_1 & (u'_1 - u'_c)v_1 & (u'_1 - u'_c)f_b \\ 0 & 0 & 0 & \dfrac{f_c}{ph} u_1 & \dfrac{f_c}{ph} v_1 & \dfrac{f_c}{ph} f_b & (v'_1 - v'_c)u_1 & (v'_1 - v'_c)v_1 & (v'_1 - v'_c)f_b \\ & & & & \vdots & & & & \\ \dfrac{f_c}{pw} u_n & \dfrac{f_c}{pw} v_n & \dfrac{f_c}{pw} f_b & 0 & 0 & 0 & (u'_n - u'_c)u_n & (u'_n - u'_c)v_n & (u'_n - u'_c)f_b \\ 0 & 0 & 0 & \dfrac{f_c}{ph} u_n & \dfrac{f_c}{ph} v_n & \dfrac{f_c}{ph} f_b & (v'_n - v'_c)u_n & (v'_n - v'_c)v_n & (v'_n - v'_c)f_b \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

{$(u_1, v_1), \ldots, (u_n, v_n)$ denote data of the first coordinate, $(u'_1, v'_1), \ldots, (u'_n, v'_n)$ denote data of the fourth coordinate, $(u'_c, v'_c)$ denotes the pixel coordinate on the image of the pattern corresponding to a center of the pattern, $f_c$ denotes the second focal length, pw denotes a width of a pixel of the image of the pattern, and ph denotes a height of a pixel of the image of the pattern}.

9. A method for calculating a posture of the marker of an optical tracking system that includes a marker configured to include a pattern that has particular information and a first lens that is spaced apart from the pattern and has a first focal length, and an image lens and sensor combination configured to include a second lens that has a second focal length and an imaging sensor that is spaced apart from the second lens and on which an image of the pattern is formed by the first lens and the second lens, and that calculates the posture of the marker for tracking the marker, the method comprising:

acquiring a first conversion matrix that converts a first coordinate corresponding to a coordinate on the pattern surface of the pattern to a second coordinate corresponding to a three-dimensional coordinate for the first lens of the marker and a second conversion matrix that converts a third coordinate corresponding to a three-dimensional coordinate of the second coordinate for the second lens to a fourth coordinate corresponding to a pixel coordinate on the image of the image lens and sensor combination; and acquiring a posture definition matrix that defines the posture of the marker from the coordinate conversion formula that converts the first coordinate to the fourth coordinate while including the first conversion matrix and the second conversion matrix.

10. The method according to claim 9, wherein the coordinate conversion formula is defined by the following equation, $$s\begin{bmatrix} u' \\ v' \\ 1 \end{bmatrix} = [A][R][C]\begin{bmatrix} u \\ v \\ 1 \end{bmatrix}$$

{(u,v) denotes the first coordinate, (u',v') denotes the fourth coordinate, [C] denotes the first conversion matrix, [A] denotes the second conversion matrix, [R] denotes the posture definition matrix, and s denotes a proportional constant}.

11. The method according to claim 10, wherein the first conversion matrix is defined by the following equation, $$[C] = \begin{bmatrix} 1 & 0 & -u_c \\ 0 & 1 & -v_c \\ 0 & 0 & f_b \end{bmatrix}$$

{($u_c$,$v_c$) denotes the coordinate of a center of the pattern and $f_b$ denotes the first focal length}, and the second conversion matrix is defined by the following equation, $$[A] = \begin{bmatrix} -\dfrac{f_c}{pw} & 0 & u'_c \\ 0 & -\dfrac{f_c}{ph} & v'_c \\ 0 & 0 & 1 \end{bmatrix}$$

{($u'_c$,$v'_c$) denotes the pixel coordinate on the image of the pattern corresponding to the center of the pattern, $f_c$ denotes the second focal length, pw denotes a width of a pixel of the image of the pattern, and ph denotes a height of a pixel of the image of the pattern}.

* * * * *